(12) United States Patent
Basham et al.

(10) Patent No.: US 10,173,087 B2
(45) Date of Patent: Jan. 8, 2019

(54) FIRE SUPPRESSION APPARATUSES AND METHODS FOR SUPPRESSING A FIRE WITH AN OBJECT

(71) Applicant: The Boeing Company, Chicago, IL (US)

(72) Inventors: Richard R. Basham, Chicago, IL (US); Thomas A. Rogers, Chicago, IL (US)

(73) Assignee: The Boeing Company, Chicago, IL (US)

(*) Notice: Subject to any disclaimer, the term of this patent is extended or adjusted under 35 U.S.C. 154(b) by 89 days.

(21) Appl. No.: 15/165,392

(22) Filed: May 26, 2016

(65) Prior Publication Data

US 2017/0340909 A1 Nov. 30, 2017

(51) Int. Cl.

| | |
|---|---|
| *A62C 3/00* | (2006.01) |
| *A62C 3/08* | (2006.01) |
| *A62C 3/06* | (2006.01) |
| *A62C 35/02* | (2006.01) |
| *A62C 99/00* | (2010.01) |
| *H01M 10/02* | (2006.01) |
| *H01M 10/0525* | (2010.01) |

(52) U.S. Cl.
CPC .............. *A62C 3/08* (2013.01); *A62C 3/06* (2013.01); *A62C 35/02* (2013.01); *A62C 99/0009* (2013.01); *H01M 10/02* (2013.01); *H01M 10/0525* (2013.01); *H01M 2200/00* (2013.01)

(58) Field of Classification Search
CPC .... A62C 2/00; A62C 2/04; A62C 3/08; A62C 99/0045; A62C 8/005; A62C 3/16; A62C 35/02; B64D 37/06; B65D 81/02; H01M 10/02; H01M 10/0525; H01M 2200/00
USPC .............. 169/48, 49, 50, 70, 91, 77, 66, 69; 220/88.1, 560.01, 23.87, 23.86, 23.83, 220/522, 521, 62.21; 86/50
See application file for complete search history.

(56) References Cited

U.S. PATENT DOCUMENTS

| | | | | |
|---|---|---|---|---|
| 1,832,056 A | * | 11/1931 | Spencer | A47G 29/06 109/33 |
| 4,991,613 A | * | 2/1991 | Kaminski | B65D 90/24 137/1 |
| 2007/0119851 A1 | * | 5/2007 | James | F42B 39/14 220/88.1 |

(Continued)

OTHER PUBLICATIONS

Extended European Search Report prepared by the European Patent Office in application No. 171729318, dated Oct. 24, 2017.

*Primary Examiner* — Alexander M Valvis
*Assistant Examiner* — Tuongminh N Pham
(74) *Attorney, Agent, or Firm* — McDonnell Boehnen Hulbert & Berghoff LLP (57) ABSTRACT

A fire suppression apparatus is described that includes a base and a lid. The base has an opening and walls defining an internal area. The base also includes a sleeve with a portion positioned in the internal area and around a perimeter of the walls, and the sleeve defines a region of the internal area for placing an object. The sleeve also has an opening for placing the object into the region. The base further has a first fire suppressing powder positioned in the internal area between the sleeve and the walls. The lid covers the opening of the base, and has a cavity, a second fire suppressing powder contained inside the cavity, and a divider positioned to cover the cavity of the lid. Methods for suppressing a fire of an object are also described.

20 Claims, 7 Drawing Sheets

(56) References Cited

U.S. PATENT DOCUMENTS

| | | | |
|---|---|---|---|
| 2007/0131684 A1* | 6/2007 | Cirillo | F42B 39/14 |
| | | | 220/88.1 |
| 2013/0146603 A1* | 6/2013 | Brilmyer | G11B 33/1406 |
| | | | 220/560.01 |
| 2013/0264346 A1 | 10/2013 | Donahue | |
| 2015/0069068 A1 | 3/2015 | Hariram | |
| 2016/0059056 A1 | 3/2016 | Hoffman | |

\* cited by examiner

┌─────────────────────────────────────────────────────────────────────────┐
│ POSITIONING A FIRST FIRE SUPPRESSING POWDER IN AN INTERNAL AREA OF A BASE │ — 252
│ THAT HAS AN OPENING AND WALLS DEFINING THE INTERNAL AREA, AND THE BASE    │
│ INCLUDES A SLEEVE IN THE INTERNAL AREA AND AROUND A PERIMETER OF THE WALLS│
│ THAT DEFINES A REGION OF THE INTERNAL AREA FOR PLACING AN OBJECT          │
└─────────────────────────────────────────────────────────────────────────┘

COLLAPSING THE FIRST FIRE SUPPRESSING POWDER ON A PORTION OF THE REGION OF — 254
THE INTERNAL AREA FOR PLACING THE OBJECT BY REMOVAL OF THE SLEEVE

COVERING THE OPENING OF THE BASE WITH A LID, WHEREIN THE LID HAS A CAVITY AND — 256
A SECOND FIRE SUPPRESSING POWDER CONTAINED INSIDE THE CAVITY

RELEASING THE SECOND FIRE SUPPRESSING POWDER INTO THE INTERNAL AREA OF THE — 258
BASE

FIG. 14

REMOVING THE DIVIDER FROM THE LID TO RELEASE THE SECOND FIRE SUPPRESSING — 260
POWDER INTO THE INTERNAL AREA OF THE BASE

FIG. 15

FIRE SUPPRESSION APPARATUSES AND METHODS FOR SUPPRESSING A FIRE WITH AN OBJECT

FIELD

The present disclosure generally relates to a fire suppression apparatus for containing, suppressing, and extinguishing a fire of an object, and more particularly to extinguishing a fire of an object caused by a lithium battery exhibiting thermal runaway.

BACKGROUND

Several systems have attempted to deal with issues of fire suppression of object due to electrical fires and lithium-ion battery fires in particular. In the aircraft industry, fires that may occur in flight can be very dangerous. Many consumer electrical devices are present onboard the aircraft, including cell phones, computers, card scanners, etc., that utilize lithium batteries, and such batteries if damaged may catch on fire. A lithium battery exhibiting thermal runaway must be disposed of properly to avoid further complications, and often times, onboard an aircraft in flight, proper disposal may be difficult.

Devices exist for attempting to suppress fires and in particular electrical or chemical fires in which water or typical fire extinguishers are insufficient, that include a volume sufficient to contain the electrical device and a covers for containing the fire within the device preventing spread of the fire. However, many of existing devices do not contemplate a thermal runaway reaction or a resulting fire that will continue, but rather are focused on isolating the dangerous condition.

What is needed is a method for handling a fire, such as a consumer electronics lithium ion battery fire, in a cabin of an aircraft during flight.

SUMMARY

In one example, a fire suppression apparatus is described that comprises a base that has an opening. The base comprises walls defining an internal area, and a sleeve with a portion positioned in the internal area and around a perimeter of the walls. The sleeve defines a region of the internal area for placing an object, and the sleeve has an opening for placing the object into the region. The base further comprises a first fire suppressing powder positioned in the internal area between the sleeve and the walls. The fire suppression apparatus also comprise a lid for covering the opening of the base. The lid comprises a cavity, a second fire suppressing powder contained inside the cavity, and a divider positioned to cover the cavity of the lid.

In another example, a method for suppressing a fire of an object is described. The method comprises placing the object into a region of an internal area of a base defined by a sleeve. The base has an opening and walls defining the internal area, and the base includes the sleeve with a portion positioned in the internal area and around a perimeter of the walls that defines the region of the internal area for placing the object. The base further comprises a first fire suppressing powder positioned in the internal area between the sleeve and the walls. The method also comprises removing the sleeve from the base causing the first fire suppressing powder to collapse on a portion of the region of the internal area for placing the object, and covering the opening of the base with a lid. The lid has a cavity and a second fire suppressing powder contained inside the cavity, and the lid comprises a divider positioned to cover the cavity of the lid. The method also comprises removing the divider from the lid to release the second fire suppressing powder into the internal area of the base.

In another example, another method for suppressing a fire of an object is described that comprises positioning a first fire suppressing powder in an internal area of a base that has an opening and walls defining the internal area, and the base includes a sleeve in the internal area and around a perimeter of the walls that defines a region of the internal area for placing an object. The method also comprises collapsing the first fire suppressing powder on a portion of the region of the internal area for placing the object by removal of the sleeve and covering the opening of the base with a lid. The lid has a cavity and a second fire suppressing powder contained inside the cavity. The method also comprises releasing the second fire suppressing powder into the internal area of the base.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, a fire suppression, containment, and extinguishing apparatus is described. The apparatus may be useful for an aircraft passenger battery fire suppression system to handle lithium battery fires in a cabin of an aircraft carrying passengers to improve safety of passengers on board. A base including a fire suppressing powder is used, for example, to engulf a burning consumer electronics device containing lithium ion batteries in flight. In addition, methods of scrubbing exhaust gasses are described to help prevent noxious fumes from entering the cabin. Additional venting methods are described to vent to an existing aircraft exhaust vent system.

Figures 1, 2, 3, 4:
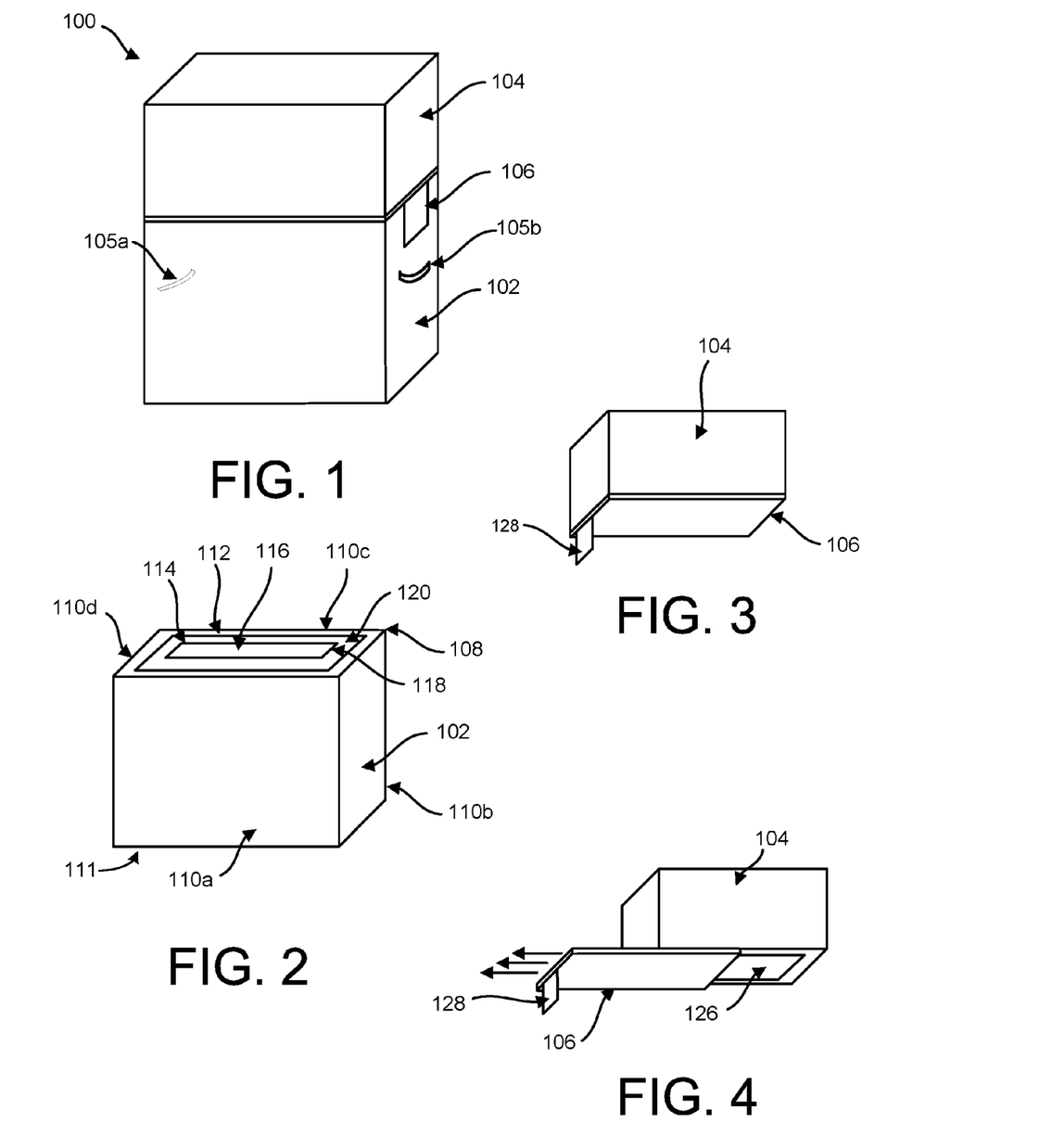
FIG. 1 illustrates an example fire suppression apparatus, according to an example embodiment.
FIG. 2 illustrates an example of a base of the apparatus, according to an example embodiment.
FIG. 3 illustrates an example of a lid and a divider of the apparatus, according to an example embodiment.
FIG. 4 illustrates an example of the lid including a second fire suppressing powder contained inside the cavity, according to an example embodiment.

Referring now to FIG. 1, an example fire suppression apparatus 100 is illustrated. The apparatus 100 includes a base 102, a lid 104, and a divider 106. The lid 104 covers an opening 108 of the base 102. The apparatus 100 is a portable container. In some examples, as shown in FIG. 1, the apparatus 100 may include handles 105a-b on either side of the base 102 for carrying the apparatus 100.

FIG. 2 illustrates an example of the base 102. The base 102 has the opening 108 and walls 110a-d and a floor 111 defining an internal area 112, and a sleeve 114 with a portion of the sleeve 114 positioned in the internal area 112 and around a perimeter of the walls 110a-d. The internal area 112 may comprise a void of the base 102. FIG. 2 illustrates an entirety of the sleeve 114 positioned in the internal area 112, however, in other examples, the sleeve 114 may extend out of the base 102. The floor 111 of the base 102 may include slots or grooves (not shown) to insert the sleeve 114 into the base 102.

The sleeve 114 defines a region 116 of the internal area 112 for placing an object (e.g., shown in FIG. 5), and the sleeve 114 has an opening 118 for placing the object into the region 116. The sleeve 114 may be rigid or flexible depending on a material used. Examples of the sleeve 114 include an aluminum or a steel frame.

The base 102 also includes a first fire suppressing powder 120 positioned in the internal area 112 between the sleeve 114 and the walls 110a-d.

FIG. 3 illustrates an example of the lid 104 that includes a cavity 122 (shown in FIG. 8), and a divider 106 positioned to cover the cavity 122 of the lid 104.

FIG. 4 illustrates an example of the lid 104 including a second fire suppressing powder 126 contained inside the cavity 122. As shown in FIG. 4, the divider 106 is removable from the lid 104 to release the second fire suppressing powder 126. The divider 106 includes one or more divider pull tabs, such as tab 128, attached to the divider 106, and the divider 106 is removable from the lid 104 via the tab 128 to release the second fire suppressing powder 126. The tab 128 is shown attached to a side of the divider 106, and the tab 128 may be attached to either side of the divider 106.

Any of the base 102, the lid 104, the sleeve 114, or the divider 106 may be aluminum or steel or a combination of aluminum and steel materials. In other examples, any of the base 102, the lid 104, the sleeve 114, or the divider 106 may include a steel lining to handle high temperatures. In still further examples, the first fire suppressing powder 120 may provide sufficient thermal isolation, and act as a liner to the base 102, so that any further thermal liner or thermal barrier of the base 102 is not needed.

The first fire suppressing powder 120 and the second fire suppressing powder 126 may be any types of powder or substances that are beneficial for suppressing a fire, and the type of powder is dependent on an application of the apparatus 100 as to types of fires to suppress. For example, to suppress a fire of a lithium-ion battery, one or both of the first fire suppressing powder 120 and the second fire suppressing powder 126 can include one or more of sand, powdered graphite, or copper powder. Additional examples of powders that can be used include talcum powder, baking soda, ABC dry chemical, soda (sodium carbonate), LITH-X (powdered graphite), dry ground dolomite, or soda ash may also be used. The powders are fire retardant powders that engulf the fire and prevent spreading of the fire, and the first fire suppressing powder 120 and the second fire suppressing powder 126 can be any combination of powders described herein as well.

Figure 5:
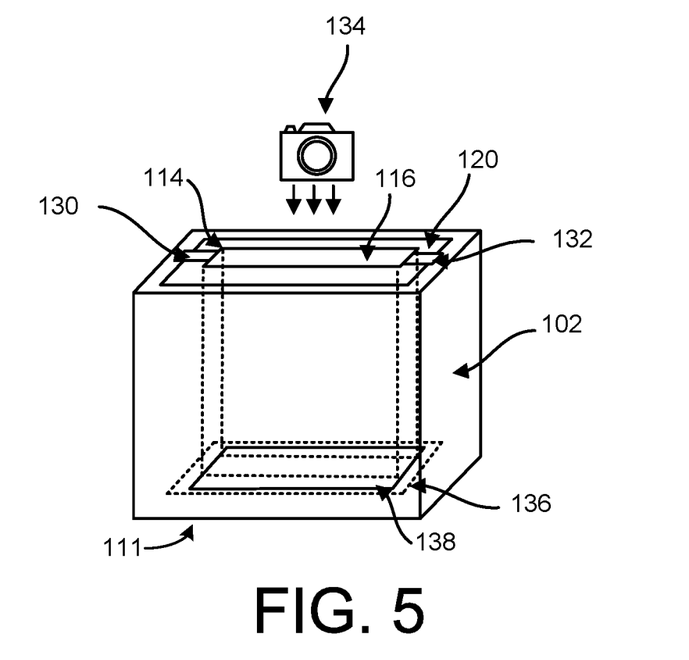
FIG. 5 illustrates an example use of the base for suppressing, containing, and/or extinguishing a fire of an object, according to an example embodiment.
Figure 6:
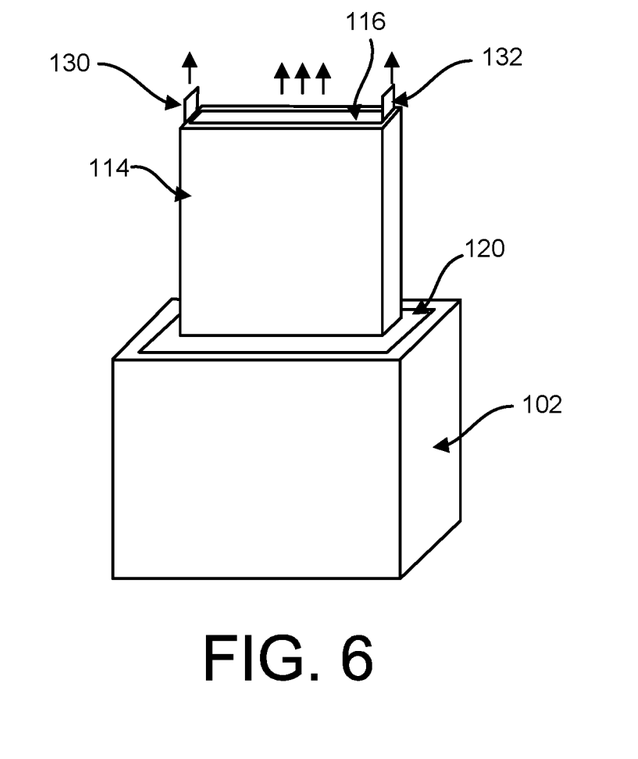
FIG. 6 illustrates the base with the sleeve being removed, according to an example embodiment.
Figure 7:
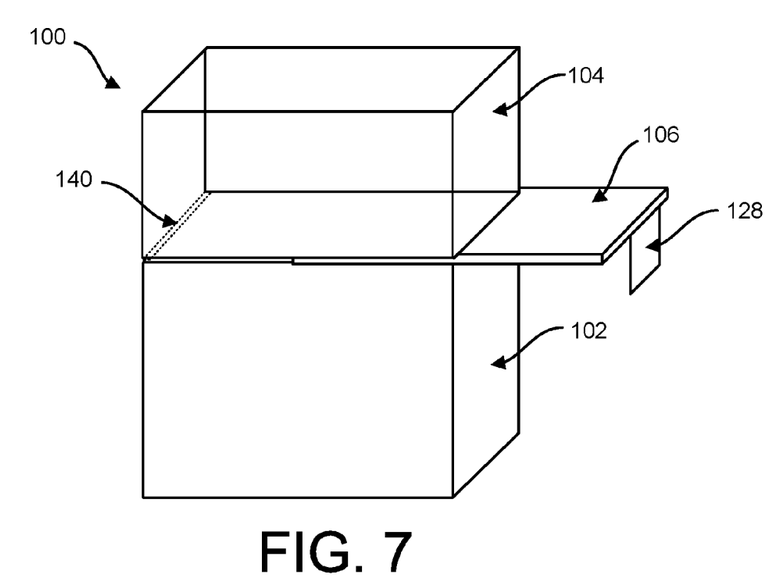
FIG. 7 illustrates an example of the apparatus with the lid attached to the base, according to an example embodiment.

FIGS. 5-7 illustrate example use of the base 102 for suppressing, containing, and/or extinguishing a fire of an object. In FIG. 5, the sleeve 114 is shown to include sleeve tabs 130 and 132 attached to sides of the sleeve 114. The sleeve tabs 130 and 132 include two sleeve tabs each attached to either side of the sleeve 114. An object 134 is positioned into the region 116 of the internal area 112. The object 134 is shown as a consumer electronics device, e.g., a digital camera. However, any object or type of object can be positioned into the region 116 based on size of the object and size of the region 116. The apparatus 100 is portable, and may include dimensions of about 18-20 inches wide, by 12 inches length, by 12 inches in height as one example. Of course, the apparatus 100 may be smaller or larger depending on an application or types of objects desired to be placed into the apparatus 100. The apparatus 100 is scalable such that many different sizes as possible and an aircraft may be provided with multiple apparatuses 100 for different objects, such as a small size apparatus 100 for cameras, mobile phones, etc., and a large size apparatus 100 for computers, video cameras, etc.

FIG. 5 also illustrates that the base 102 can also include a thermal isolation insert 136 positioned at the floor 111 of the base 102 to provide additional thermal isolation. As an example, the insert 136 may comprise a stainless steel material to handle high temperatures. In other examples, the insert 136 is not included, and the floor 111 of the base 102 itself may comprise stainless steel to handle high temperatures, while a remainder of the base 102 can be aluminum. A layer of the first fire suppressing powder 138 is positioned at the floor 111 of the base 102 and on top of the insert 136, if included. The sleeve 114 then extends to the layer of the first fire suppressing powder 136 positioned at the floor 111 of the base 102.

FIG. 6 illustrates the base 102 with the sleeve 114 being removed. The sleeve 114 is removable from the base 102 to cause or allow the first fire suppressing powder 120 to collapse on a portion of the region 116 of the internal area 112 for placing the object 134. The sleeve 114 is removable from the base 102 via the sleeve tabs 130 and 132 causing the first fire suppressing powder 120 to collapse on a portion of the region 116 of the internal area 112 for placing the object 134. The sleeve 114 may be positioned in the internal area 112 spaced apart from the walls 110a-d by about 1-2 inches (which can vary based on width of the apparatus 100), and the space between the sleeve 114 and the walls 110a-d is filled with the first fire suppressing powder 120. The space between the sleeve 114 and the walls 110a-d can be filled entirely with the first fire suppressing powder 120 or possibly only partly filled with the first fire suppressing powder 120. In any event, removal of the sleeve 114 allows the first fire suppressing powder 120 to fall onto any object positioned in the region 116.

While FIG. 6 illustrates that the sleeve 114 is removable from the base 102, in other embodiments, the sleeve 114 comprises a flammable material, and based on the sleeve 114 becoming inflamed due to placing an object on fire into the region 116, the first fire suppressing powder 120 collapses on a portion of the region 116 of the internal area 112 once the sleeve 114 burns away. As one example, the sleeve 114 may comprise a wax material that melts when on fire or due to increased temperatures.

FIG. 7 illustrates an example of the apparatus 100 with the lid 104 attached to the base 102. Once the object 134 on fire is positioned into the region 116 of the base 102 and the sleeve 114 is removed, the first fire suppressing powder 120 collapses on a portion of the region 116 of the internal area 112 to cover at least a portion of the object 134 on fire. This may extinguish the fire, or could extinguish a portion of the fire of the object 134. Then, by placing the lid 104 to cover the opening 108 of the base 102, the internal area 112 of the base 102 is now enclosed so as to contain the fire in the apparatus 100.

The lid 104 may be snapped onto the base 102 or slide onto the base 102, and can be fully removed. In other examples, the lid 104 is hingedly attached to the base 102 through a hinge 140. Within examples, the lid 104 may overlap the base 102 such that after removal of the divider 106, the opening 108 of the base 102 is enclosed by the lid 104 and the apparatus 100 is fully enclosed. In this way, noxious fumes remain inside the apparatus 100.

Figure 8:
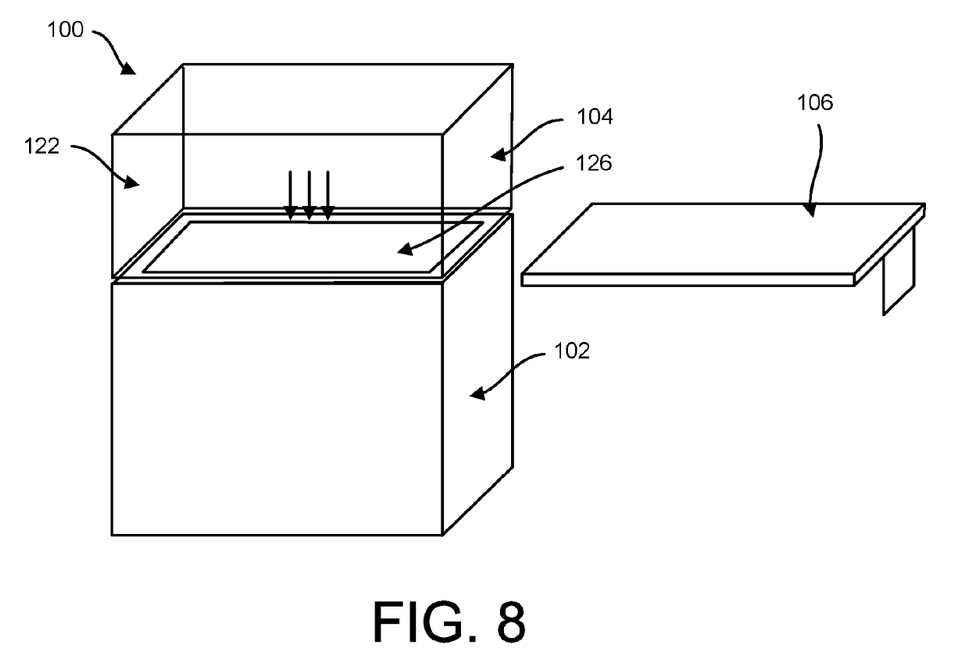
FIG. 8 illustrates an example of the apparatus with the lid attached to the base, and the divider removed, according to an example embodiment.

FIG. 8 illustrates an example of the apparatus 100 with the lid 104 attached to the base 102, and the divider 106 removed. The divider 106 is removable from the lid 104 to release the second fire suppressing powder 126 into the internal area 112 of the base 102. The cavity 122 of the lid 104 can be full of the second fire suppressing powder 126, and after removal of the divider 106, the second fire suppressing powder 126 falls down into the internal area 112 of the base 102 and covers the object 134 to further suppress and extinguish the fire. The divider 106 can be manually removed by sliding the divider 106 out of the apparatus 100.

As an example use of the apparatus 100 onboard an aircraft in flight, a crew member can carry the apparatus 100 to a point of the object 134 on fire. The crew member may use a tool (not shown and may include tongs to grip the object 134, or pliers/vice grips with a safety mechanism or shield to protect the user) for safely handling the object 134 on fire. The lid 104 can be removed and the object 134 on fire can be positioned into the region 116 inside the sleeve 114. Following, the sleeve 114 is removed causing the first fire suppressing powder 120 to fall into the region 116 and bury or partially bury the object 134 on fire. At this point, the object 134 may be fully covered by the first fire suppressing powder 120, and to ensure that the object 134 is fully covered by fire retardants, the lid 104 is then positioned onto the base 102 and the divider 106 is removed causing the second fire suppressing powder 126 in the lid 104 to fall down and bury the object 134 on fire. This can completely bury the object 134 in fire retardant powder and provide thermal insulation between the fire and an ambient environment. As a result, the apparatus 100 contains the fire, suppresses the fire, and extinguishes the fire.

Both the lid 104 and the base 102 containing fire retardant powders. An amount of the first fire suppressing powder 120 contained in the base 102 combined with an amount of the second fire suppressing powder 126 contained in the lid 104 substantially fills the internal area 112 of the base 104. Specific amounts of the powder depend on a size and dimensions of the apparatus 100. However, together, amounts of powder contained in the lid 104 and the base 102 can be enough to about fill the internal area 112 of the base 102. By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In some examples, the lid 104 may contain more amount of powder than in the base 102, or the amount of powder in the lid 104 as compared to the base 102 can be in a ratio of 1:1, or 1:2, or 2:1, depending on sizes of the lid 104 and the base 102.

Figure 9:
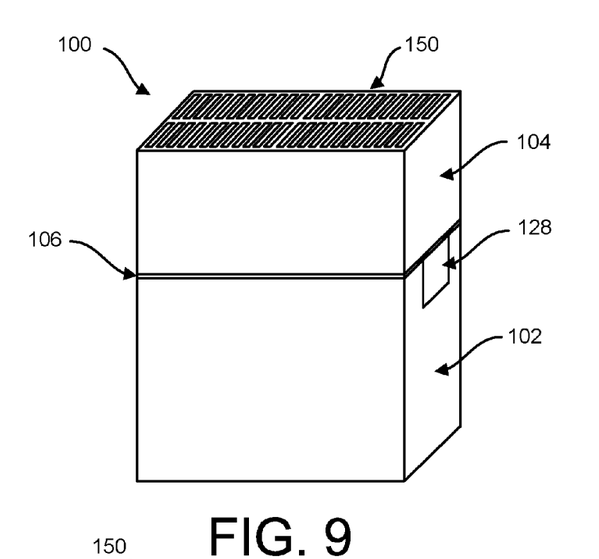
FIG. 9 illustrates an example of the apparatus with the lid attached to the base, and the lid includes venting capabilities, according to an example embodiment.

FIG. 9 illustrates an example of the apparatus 100 with the lid 104 attached to the base 102, and the lid 104 includes venting capabilities. For example, the lid 104 is shown to include louvers 150 that can open and close to vent the apparatus 100. In this manner, fumes or smoke can be vented out of the apparatus 100 through the louvers 150.

Figure 10:
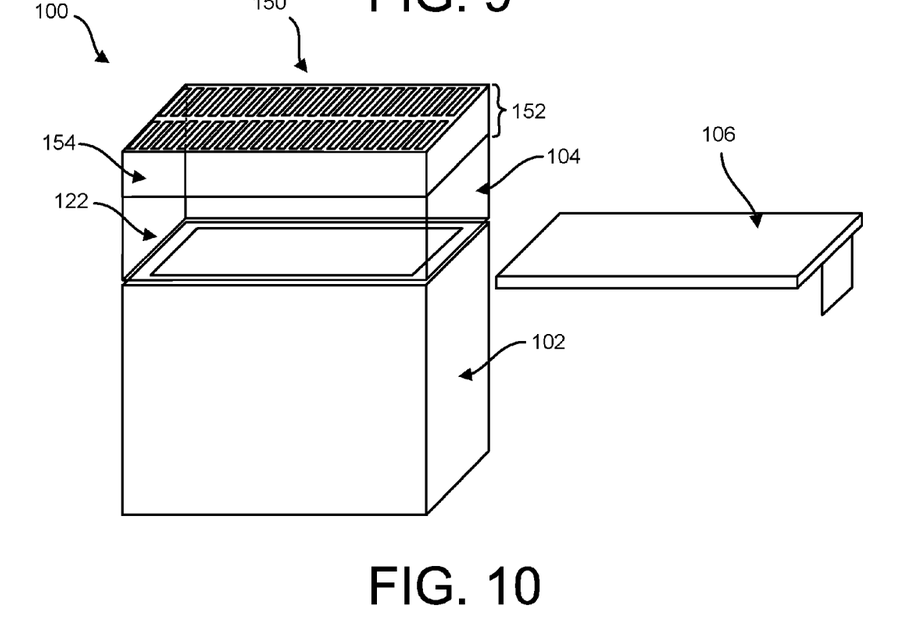
FIG. 10 illustrates an example of the apparatus with the lid attached to the base, and the lid includes an air filtration device adjacent the cavity, according to an example embodiment.

FIG. 10 illustrates an example of the apparatus 100 with the lid 104 attached to the base 102, and the lid 104 includes an air filtration device 152 adjacent the cavity 122. The air filtration device 152 includes the louvers 150 and also a region 154 containing activated carbon and a catalyst for scrubbing air to remove chemicals. The air filtration device 152 can reduce noxious fumes from entering a cabin of an aircraft. Activated carbon is carbon that has been treated with oxygen to adsorb certain chemicals that are attracted to the activated carbon. Catalysts can be added toenable the air filtration device 152 to attract non-carbon based chemicals as well. Thus, the air filtration device 152 can filter any fumes resulting from extinguishing the fire.

Figure 11:
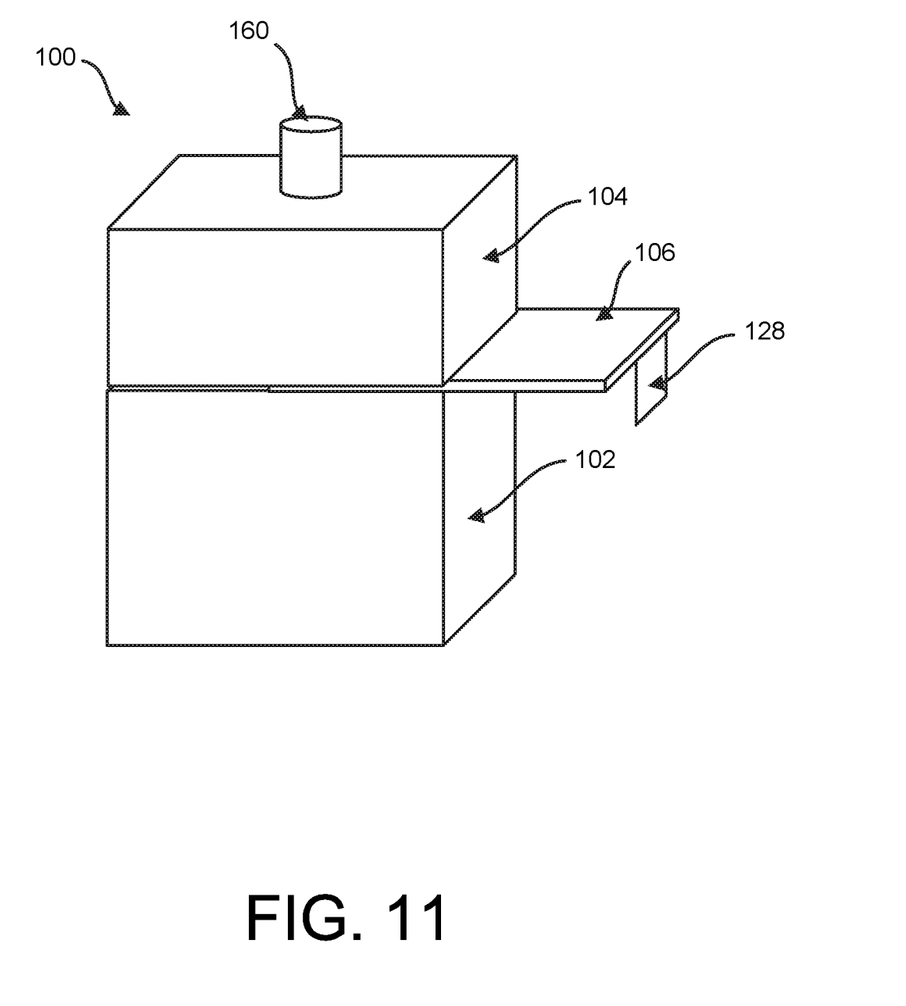
FIG. 11 illustrates an example of the apparatus with the lid attached to the base, and the lid includes a vent for connection to a hose enabling exhaustion of fumes, according to an example embodiment.

FIG. 11 illustrates an example of the apparatus 100 with the lid 104 attached to the base 102, and the lid 104 includes a vent 160 for connection to a hose enabling exhaustion of fumes. The vent 160 can connect to a hose of a portable scrubber that includes activated carbon and a catalyst, or the vent 160 can connect to a hose of the aircraft to vent to an ambient environment outside the aircraft, for example.

Figure 12:
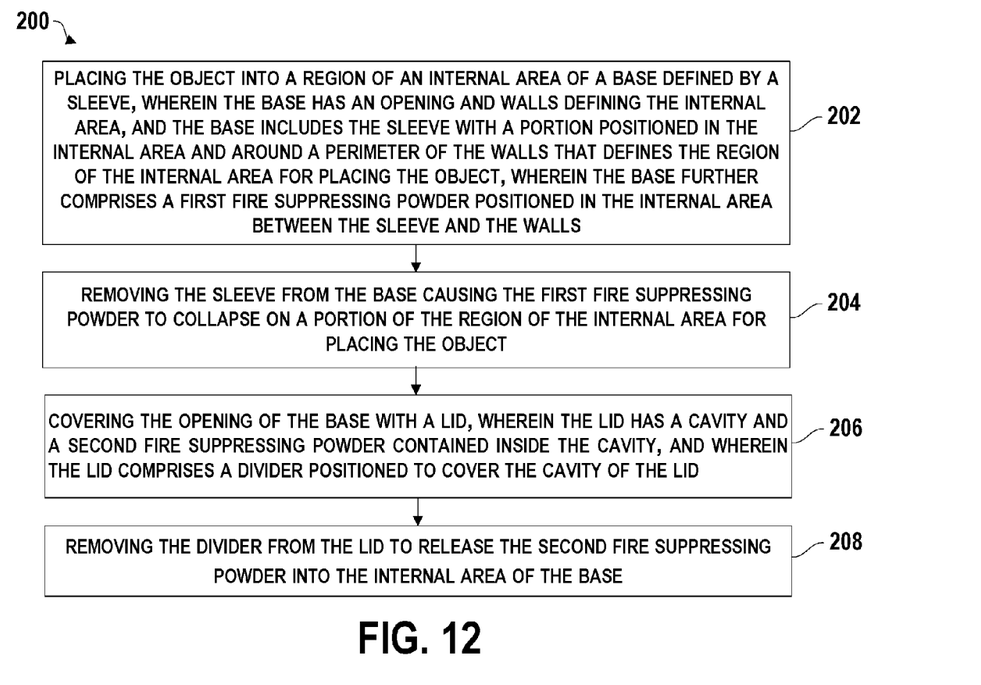
FIG. 12 shows a flowchart of an example method for suppressing a fire of the object, according to an example embodiment.

FIG. 12 shows a flowchart of an example method 200 for suppressing a fire of the object 134, according to an example embodiment. Method 200 shown in FIG. 12 presents an embodiment of a method that, for example, could be used with the apparatus 100 as shown and described herein, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes placing the object 134 into the region 116 of the internal area 112 of the base 102 defined by the sleeve 114. The base 102 has the opening 108 and the walls 110a-d defining the internal area 112, and the base 104 includes the sleeve 114 with a portion positioned in the internal area 112 and around a perimeter of the walls 110a-d that defines the region 116 of the internal area 112 for placing the object 134. The base 102 further comprises the first fire suppressing powder 120 positioned in the internal area 112 between the sleeve 114 and the walls 110a-d.

At block 204, the method 200 includes removing the sleeve 114 from the base 102 causing the first fire suppressing powder 120 to collapse on a portion of the region 116 of the internal area 112 for placing the object 134.

At block 206, the method 200 includes covering the opening 108 of the base 102 with the lid 104. The lid 104 has the cavity 122 and the second fire suppressing powder 126 is contained inside the cavity 122. The lid 104 comprises the divider 106 positioned to cover the cavity 122 of the lid 104.

At block 208, the method 200 includes removing the divider 104 from the lid 104 to release the second fire suppressing powder 126 into the internal area 112 of the base 102. This causes the object 134 to be covered with fire retardant powder to suppress and extinguish the fire.

Figure 13:
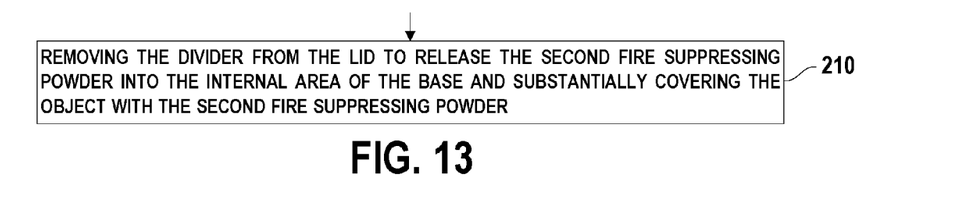
FIG. 13 shows a flowchart of an example method for use with the method shown in FIG. 12, according to an example embodiment.

FIG. 13 shows a flowchart of an example method for use with the method 200, according to an example embodiment. At block 210, functions include removing the divider 106 from the lid 104 to release the second fire suppressing powder 126 into the internal area 112 of the base 102 and substantially covering the object 134 with the second fire suppressing powder 126. In this example, an amount of the first fire suppressing powder 120 contained in the base 102 combined with an amount of the second fire suppressing powder 126 contained in the lid 104 substantially fills the internal area 112 of the base 102.

Figure 14:
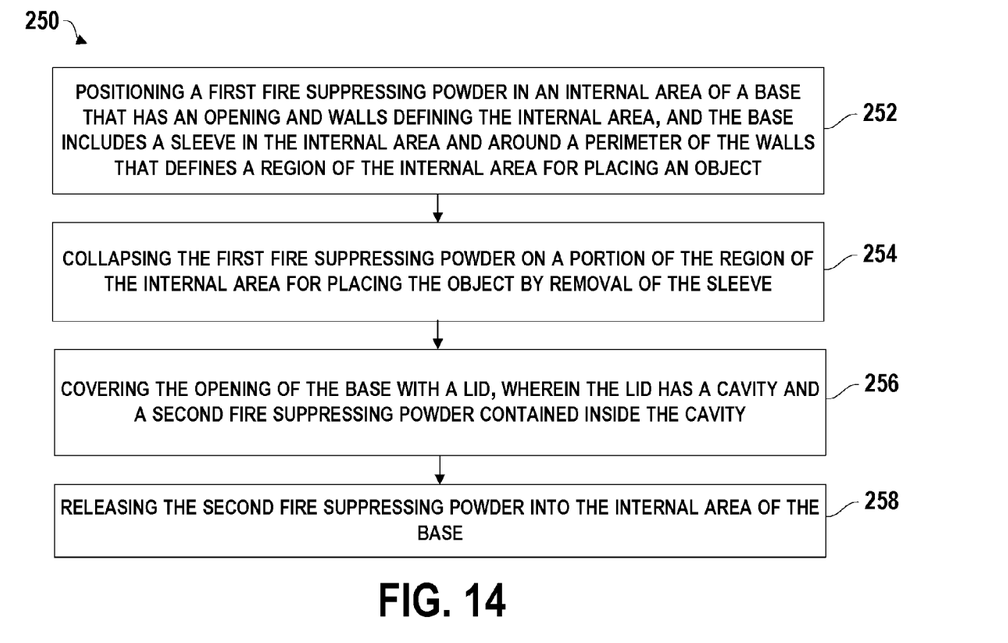
FIG. 14 shows a flowchart of another example method for suppressing a fire of the object, according to an example embodiment.

FIG. 14 shows a flowchart of another example method 250 for suppressing a fire of the object 134, according to an example embodiment. Method 250 shown in FIG. 12 presents an embodiment of a method that, for example, could be used with the apparatus 100 as shown and described herein, for example.

At block 252, the method 250 includes positioning the first fire suppressing powder 120 in the internal area 112 of the base 102 that has the opening 108 and the walls 110a-d defining the internal area 112, and the base 102 includes the sleeve 114 in the internal area 112 and around a perimeter of the walls 110a-d that defines the region 116 of the internal area 112 for placing the object 134.

At block 254, the method 250 includes collapsing the first fire suppressing powder 120 on a portion of the region 116 of the internal area 112 for placing the object 134 by removal of the sleeve 114.

At block 256, the method 250 includes covering the opening 108 of the base 102 with the lid 104. The lid 104 has the cavity 122 and the second fire suppressing powder 126 contained inside the cavity 122.

At block 258, the method 250 includes releasing the second fire suppressing powder 126 into the internal area 112 of the base 102.

Figure 15:
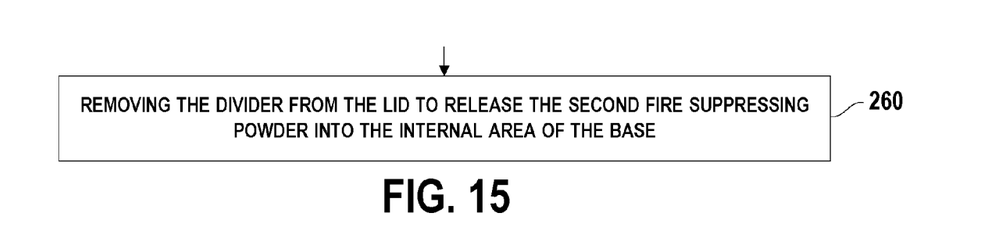
FIG. 15 shows a flowchart of an example method for use with the method shown in FIG. 14, according to an example embodiment.

FIG. 15 shows a flowchart of an example method for use with the method 250, according to an example embodiment. 20. The lid 104 includes the divider 106 positioned to cover the cavity 122 of the lid 104. At block 260, functions include removing the divider 106 from the lid 104 to release the second fire suppressing powder 126 into the internal area 112 of the base 102.

Although many examples described herein include use of the apparatus 100 onboard an aircraft, the apparatus 100 may be used in many other applications, such as on commercial and public bus or trains. The apparatus 100 is a portable container that can be used for any public or private transportation, or in any setting (not just transportation related). Also, the apparatus 100 can be designed to accommodate any type of object on fire depending on a size of the apparatus 100 as well as a type of fire retardant powder included in the base 102 and the lid 104.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A fire suppression apparatus, comprising:
    a base having an opening and comprising:
        walls defining an internal area;
        a single sleeve with a portion positioned in the internal area of the base and configured as a continuous material around an interior perimeter of the walls of the base, the sleeve defining a region of the internal area for placing an object, and the sleeve having an opening for placing the object into the region;
        a first fire suppressing powder positioned in the internal area between the sleeve and the walls; and
    a lid having a side configured to couple to a wall of the base and for covering the opening of the base, wherein the lid comprises:
        a cavity;
        a second fire suppressing powder contained inside the cavity; and
        a divider positioned to cover the cavity of the lid.

2. The fire suppression apparatus of claim 1, wherein the sleeve is removable from the base causing the first fire suppressing powder to collapse on a portion of the region of the internal area for placing the object.

3. The fire suppression apparatus of claim 1, further comprising one or more sleeve tabs attached to the sleeve, wherein the sleeve is removable from the base via the one or more sleeve tabs causing the first fire suppressing powder to collapse on a portion of the region of the internal area for placing the object.

4. The fire suppression apparatus of claim 1, wherein the sleeve comprises a flammable material, and based on the sleeve becoming inflamed, the first fire suppressing powder collapses on a portion of the region of the internal area for placing the object.

5. The fire suppression apparatus of claim 1, wherein the divider is removable from the lid to release the second fire suppressing powder into the internal area of the base.

6. The fire suppression apparatus of claim 1, further comprising one or more divider pull tabs attached to the divider, wherein the divider is removable from the lid via the one or more divider pull tabs to release the second fire suppressing powder into the internal area of the base.

7. The fire suppression apparatus of claim 1, wherein an amount of the first fire suppressing powder contained in the base combined with an amount of the second fire suppressing powder contained in the lid substantially fills the internal area of the base.

8. The fire suppression apparatus of claim 1, wherein the lid is hingedly attached to the base.

9. The fire suppression apparatus of claim 1, wherein the lid covers the opening of the base and encloses the internal area of the base.

10. The fire suppression apparatus of claim 1, wherein the apparatus is a portable container.

11. The fire suppression apparatus of claim 1, further comprising a layer of the first fire suppressing powder positioned at a floor of the base.

12. The fire suppression apparatus of claim 11, wherein the sleeve extends to the layer of the first fire suppressing powder positioned at the floor of the base.

13. The fire suppression apparatus of claim 1, further comprising a thermal isolation insert positioned at a floor of the base to provide additional thermal isolation.

14. The fire suppression apparatus of claim 1, wherein one or both of the first fire suppressing powder and the second fire suppressing powder include one or more of sand, powdered graphite, or copper powder.

15. The fire suppression apparatus of claim 1, wherein the lid further comprises an air filtration device adjacent the cavity.

16. The fire suppression apparatus of claim 1, wherein the lid further comprises a vent for connection to a hose enabling exhaustion of fumes.

17. A method for suppressing a fire of an object, the method comprising:
placing the object into a region of an internal area of a base defined by a single sleeve, wherein the base has an opening and walls defining the internal area, and the base includes the sleeve with a portion positioned in the internal area of the base and configured as a continuous material around an interior perimeter of the walls of the base that defines the region of the internal area for placing the object, wherein the base further comprises a first fire suppressing powder positioned in the internal area between the sleeve and the walls;
removing the sleeve from the base causing the first fire suppressing powder to collapse on a portion of the region of the internal area for placing the object;
covering the opening of the base with a lid having a side configured to couple to a wall of the base, and wherein the lid has a cavity and a second fire suppressing powder contained inside the cavity, and wherein the lid comprises a divider positioned to cover the cavity of the lid; and
removing the divider from the lid to release the second fire suppressing powder into the internal area of the base.

18. The method of claim 17, wherein an amount of the first fire suppressing powder contained in the base combined with an amount of the second fire suppressing powder contained in the lid substantially fills the internal area of the base, and wherein removing the divider from the lid to release the second fire suppressing powder into the internal area of the base comprises substantially covering the object with the second fire suppressing powder.

19. A method for suppressing a fire of an object, the method comprising:
positioning a first fire suppressing powder in an internal area of a base that has an opening and walls defining the internal area, and the base includes a single sleeve in the internal area of the base and configured as a continuous material around an interior perimeter of the walls of the base that defines a region of the internal area for placing an object;
collapsing the first fire suppressing powder on a portion of the region of the internal area for placing the object by removal of the sleeve;
covering the opening of the base with a lid having a side configured to couple to a wall of the base, and wherein the lid has a cavity and a second fire suppressing powder contained inside the cavity, and wherein the lid comprises a divider positioned to cover the cavity of the lid; and
releasing the second fire suppressing powder into the internal area of the base.

20. The method of claim 19, wherein the lid comprises a divider positioned to cover the cavity of the lid, and wherein releasing the second fire suppressing powder into the internal area of the base comprises:
removing the divider from the lid to release the second fire suppressing powder into the internal area of the base.

* * * * *